United States Patent
Phillips et al.

(10) Patent No.: US 9,332,313 B2
(45) Date of Patent: May 3, 2016

(54) PERSONALIZED AUGMENTED A/V STREAM CREATION

(75) Inventors: Christopher Phillips, Chandlers Ford (GB); Katherine M. Shann, Eastleigh (GB); Matthew Whitbourne, Horndean (GB); Daniel E. Would, Eastleigh (GB); Shanna Xu, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/346,899

(22) PCT Filed: Jun. 19, 2012

(86) PCT No.: PCT/EP2012/061655
§ 371 (c)(1),
(2), (4) Date: Mar. 24, 2014

(87) PCT Pub. No.: WO2013/045123
PCT Pub. Date: Apr. 4, 2013

(65) Prior Publication Data
US 2014/0237510 A1    Aug. 21, 2014

(30) Foreign Application Priority Data

Sep. 28, 2011 (EP) ..................................... 11183186

(51) Int. Cl.
*H04N 21/462* (2011.01)
*H04N 21/235* (2011.01)
(Continued)

(52) U.S. Cl.
CPC ........ *H04N 21/4622* (2013.01); *G06F 17/3002* (2013.01); *G06F 17/30029* (2013.01); *G06F 17/30038* (2013.01); *G06F 17/30044* (2013.01); *G06F 17/30817* (2013.01);
(Continued)

(58) Field of Classification Search
None
See application file for complete search history.

(56) References Cited

U.S. PATENT DOCUMENTS

| 8,526,609 B1* | 9/2013 | Huang ............... H04N 21/4305 348/263 |
| 2006/0149781 A1* | 7/2006 | Blankinship ...... G06F 17/30038 |

(Continued)

FOREIGN PATENT DOCUMENTS

WO    0139011 A2    5/2001

OTHER PUBLICATIONS

International Searching Authority, International Search Report and Written Opinion for International Application No. PCT/EP2012/061655, Mailed September 5, 2012.

(Continued)

*Primary Examiner* — Ricky Chin
(74) *Attorney, Agent, or Firm* — Law Office of Jim Boice

(57) ABSTRACT

A personalized audio and/or video (AV) stream is created for a user. A first stream of AV data is selected by reference to predetermined user preferences. One or more further data streams having a predetermined relation to the first stream are selected. Portions of the first stream are identified and captured by reference to identifying predetermined indicia in a group of streams consisting of the first stream and the one or more further data streams, where the capturing comprises capturing one or more time stamps from the group of streams. The personalized AV stream, comprising a captured portion of the first stream and data selected by reference to the predetermined indicia from at least one of the further data streams is generated, where the data selected is based on each captured timestamp.

18 Claims, 5 Drawing Sheets

(51) Int. Cl.
*H04N 21/2668* (2011.01)
*H04N 21/4788* (2011.01)
*H04N 21/4782* (2011.01)
*H04N 21/84* (2011.01)
*G06F 17/30* (2006.01)

(52) U.S. Cl.
CPC ........ *H04N 21/235* (2013.01); *H04N 21/2668* (2013.01); *H04N 21/462* (2013.01); *H04N 21/4782* (2013.01); *H04N 21/4788* (2013.01); *H04N 21/84* (2013.01)

(56) References Cited

U.S. PATENT DOCUMENTS

| | | |
|---|---|---|
| 2008/0131077 A1 | 6/2008 | Jones et al. |
| 2009/0162024 A1 | 6/2009 | Bradicich et al. |
| 2009/0228492 A1 | 9/2009 | Valdez et al. |
| 2010/0119208 A1 | 5/2010 | Davis et al. |
| 2010/0153984 A1 | 6/2010 | Neufeld |
| 2010/0318520 A1* | 12/2010 | Loeb ................ G06F 17/30056 707/743 |
| 2011/0004477 A1 | 1/2011 | Bansal et al. |
| 2011/0058101 A1* | 3/2011 | Earley ................ H04L 12/1822 348/461 |
| 2011/0221962 A1* | 9/2011 | Khosravy ........... H04N 21/4622 348/563 |
| 2011/0225178 A1 | 9/2011 | Ingrassia et al. |

OTHER PUBLICATIONS

M. Baca et al., "Television Meets Facebook: Social Networks Through Consumer Electronics", Adj. Proceedings of the 6th European Conference on Interactive Television, 2008, pp. 35-36.

Anonymous, "Digital Video Recorder", wikipedia.org, Retrieved Mar. 28, 2011, pp. 1-12.

Anonymous, "DirecTV to Insert ads Into DVRs", Light Reading, Cable News Wire Feed, Mar. 22, 2011, pp. 1-2.

R. Kastelein, "Social Media Meets Online Television: Social TV Brings Television 2.0 to Your TV Set", Masternewmedia, Ikonos New Media, Rome, Italy, Jan. 27, 2010, pp. 1-10.

* cited by examiner

PERSONALIZED AUGMENTED A/V STREAM CREATION

BACKGROUND

The present invention relates generally to the field of audio and/or video (hereinafter "AV") data stream capture and processing. More particularly, the present invention relates to the identification and handling of AV stream components by reference to, or in conjunction with, ancillary data from one or more further data streams linked to the AV data stream, especially social media streams.

Recent years have seen a huge growth in the area of web-based and mobile technologies referred to generally as social media by which users can form online or networked groups for the exchange of comments and creation and sharing of media comment such as AV clips. Well-known examples include Facebook, flickr, YouTube and Twitter.

A more recent development is Social TV which has attempted to integrate television broadcasts with social media feeds to provide greater interactivity through enabling viewers to post comments as the broadcast happens: an example of this from the UK is the political debate program "Question Time" which hosts a live Twitter feed as the broadcast is aired to allow viewers to join the debate.

As part of the shared experience, users may wish to identify (tag) individual segments of a broadcast as being of potential interest to others, with a resulting stream of tagged portions creating a user-defined highlights package of the broadcast In one known method to enable such tagging, in response to a user request to mark a portion of media content, a tag is inserted in the stream which tag may subsequently be used to access the tagged portion of content.

A problem arises when it is desired not only to capture AV segments, but also the related social media data (comments, links to related content and so forth). Devices such as a personal video recorder (PVR) are commonly used to record TV programs. This allows a user to watch a football match, for instance, at a later time and skip through adverts. This is not very sociable in the sense that the user misses out on discussions/highlights that are posted on the social media at the time when the event is broadcasting live. The user could surf related websites and watch highlights/discussions before or after watching the recorded match. However this is time consuming and the user may end up watching parts of the match many times. Sometimes it also spoils the fun, if the user wanted to avoid but then accidentally saw the results. There is no currently satisfactory mechanism to embed the comments/highlights into a recorded program.

A problem involves how to correctly associate the comments in the social media stream with the moment in the recording that they are associated with. This problem arises because people watching a program 'live' are not all necessarily watching the program at the same time. Viewers experience different levels of lag depending on whether they are watching the program through normal terrestrial TV, a satellite broadcast, or an internet streaming service (for example the BBC's iPlayer service). Comments may also arrive significantly after a given event, depending on the user's behavior.

It is therefore an object of the present invention to provide a method and supporting system to improve the integration of AV streams with data from associated streams, such as social media feeds.

SUMMARY

In one embodiment of the present invention, a method and/or computer program product creates a personalized audio and/or video (AV) stream for a user. The method comprises: selecting a first stream of AV data by reference to predetermined user preferences; selecting one or more further data streams having a predetermined relation to the first stream; identifying and capturing portions of the first stream by reference to identifying predetermined indicia in a group of streams consisting of said first stream and said one or more further data streams, wherein said capturing comprises capturing one or more time stamps from the group of streams; and generating a personalized AV stream comprising a captured portion of the first stream and data selected by reference to said predetermined indicia from at least one of said one or more further data streams, said data selected being based on each captured timestamp.

In one embodiment of the present invention, an apparatus, operable to create a personalized audio and/or video (AV) stream for a user, comprises: a hardware data recorder connectable to, and operable to record data from, a first stream of AV data and one or more further data streams having a predetermined relation to the first stream; monitoring hardware means coupled with the hardware data recorder and configured to identify predetermined indicia in said first stream or one of said one or more further data streams and, in response thereto, cause the data recorder to capture a portion of the first stream, including capturing one or more timestamps from the first or further stream; wherein the hardware data recorder is further operable to generate and play back a personalized AV stream comprising a captured portion of the first stream and data selected by reference to said predetermined indicia from at least one of said one or more further data streams, said selection being based on each captured timestamp.

The summary of the present invention does not recite all the necessary features of the invention, and sub-combinations of those features may also encompass the invention.

BRIEF DESCRIPTION OF THE DRAWINGS

The present invention will now be described, by way of example only, with reference to preferred embodiments, as illustrated in the following figures, in which.

DETAILED DESCRIPTION

Figure 1:
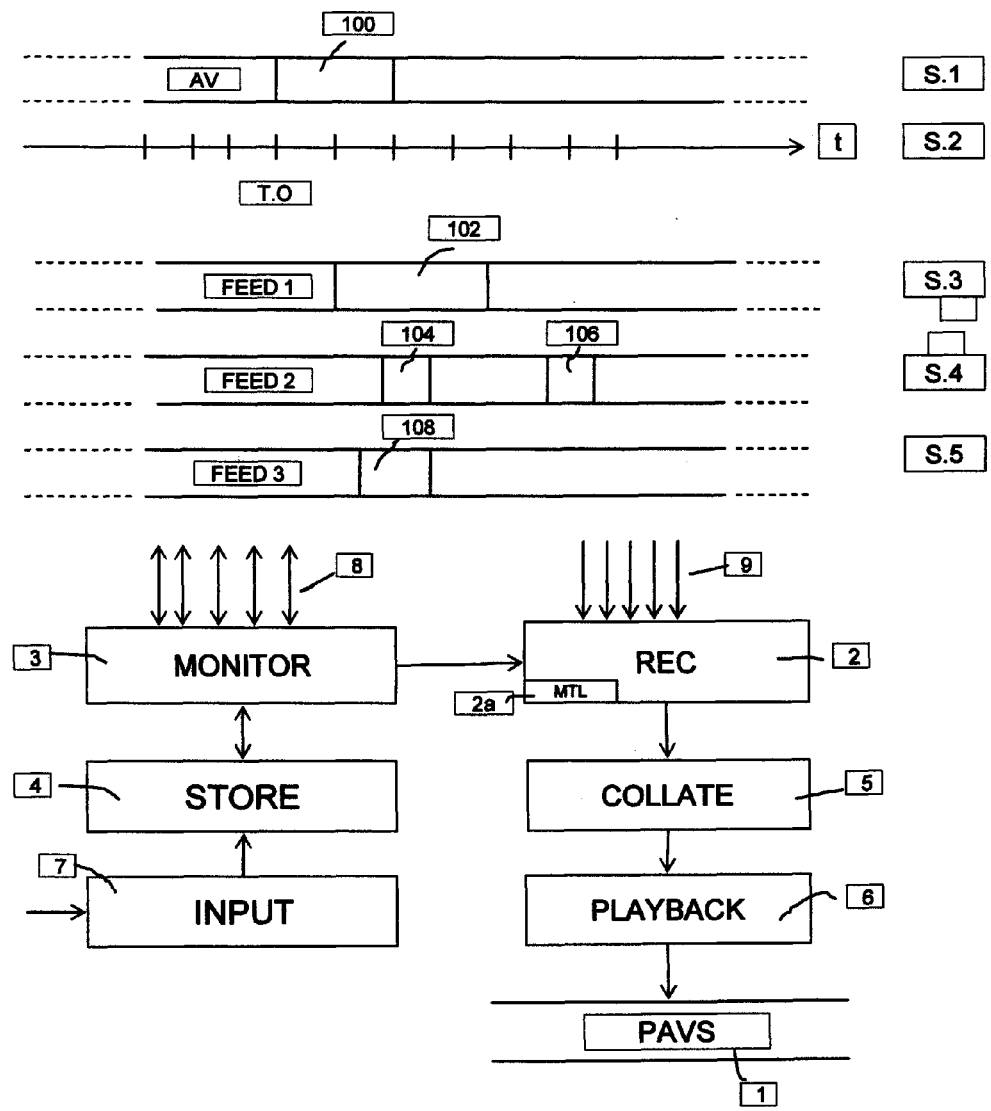
FIG. 1 schematically represents a series of data streams and functional components of a system for personalized AV stream creation.

With reference now to the figures, FIG. 1 schematically represents the components of an apparatus operable to create a personalized audio and/or video stream (PAVS) 1 for a user, comprising a data recorder 2 connectable to, and operable to record data from, a first stream of AV data S.1 and one or more further data streams S.3-S.5 having a predetermined relation to the first stream. In this embodiment, the first stream S.1 is a television broadcast, and further streams S.3-S.5 are social media streams carrying comments relating to the television broadcast. A further stream S.2 provides a reference time signal source. As will be described below, this reference timeline may be derived from the AV stream or one of the comment streams.

The apparatus includes a monitoring stage 3 coupled with the data recorder 2 and further coupled 8 to access the AV and comment streams. The monitoring stage 3 is configured to identify predetermined indicia (as will be described below) in the AV stream S.1 or one of the comment streams S.3-S.5 and, in response thereto, cause the data recorder 2 to capture a portion 100 of the AV stream S.1. Capture of the AV portion 100 further includes capturing at least one timestamp T.0 from the reference timeline S.2, and subsequent capture of portions 102, 104, 106, 108 of the comment streams S.3-S.5, which capture is generally indicated in the figure by the reference numeral 9.

The indicia to be used by the monitoring stage 3 are stored in associated memory 4, and are suitably provided by user-operable input means 7. The indicia may be simple keywords to be identified in one of the comment streams S.3-S.5 or in the soundtrack or an associated subtitle stream (not shown) of the AV stream S.1. Also, a threshold test may be implemented, requiring two or more detected instances of an indicia before capture is triggered. Alternately, the user input may comprise direct "start capture" and "stop capture" commands which trigger the recording stage 2 to start/stop recording from the AV stream. Suitably, the recording stage is a digital AV recorder running on a loop (e.g. perpetually recording the last 5 minutes from the AV stream) such that a "start capture" command will include, say, the previous 60 seconds of recorded AV: this will allow a user who, for example, spots himself in the audience of a TV broadcast, to capture that appearance in portion 100 provided that the "start capture" command is issued within 60 seconds of the appearance. Preferentially, the captured timestamp T.0 is that coinciding with the start of the captured portion, rather than the instant at which the user command is input.

The data recorder is further operable to generate (by means of collation stage 5) and play back (stage 6) the personalized AV stream 1 comprising a captured portion of the AV stream S.1, combined with the selected and captured data from the comment streams. As will be described below, the selection from the comment streams is based (at least partly) on all or each captured time stamp.

In operation, the apparatus will typically create a sequence of captured AV segments 100 and associated comment in the personalized AV stream 1. In order to tie these together in a logical sequence, the data recorder 2 creates and stores a master timeline MTL 2a by reference to the time signal S.2 containing the sequence of timestamps captured in conjunction with the AV segment.

Figure 2:
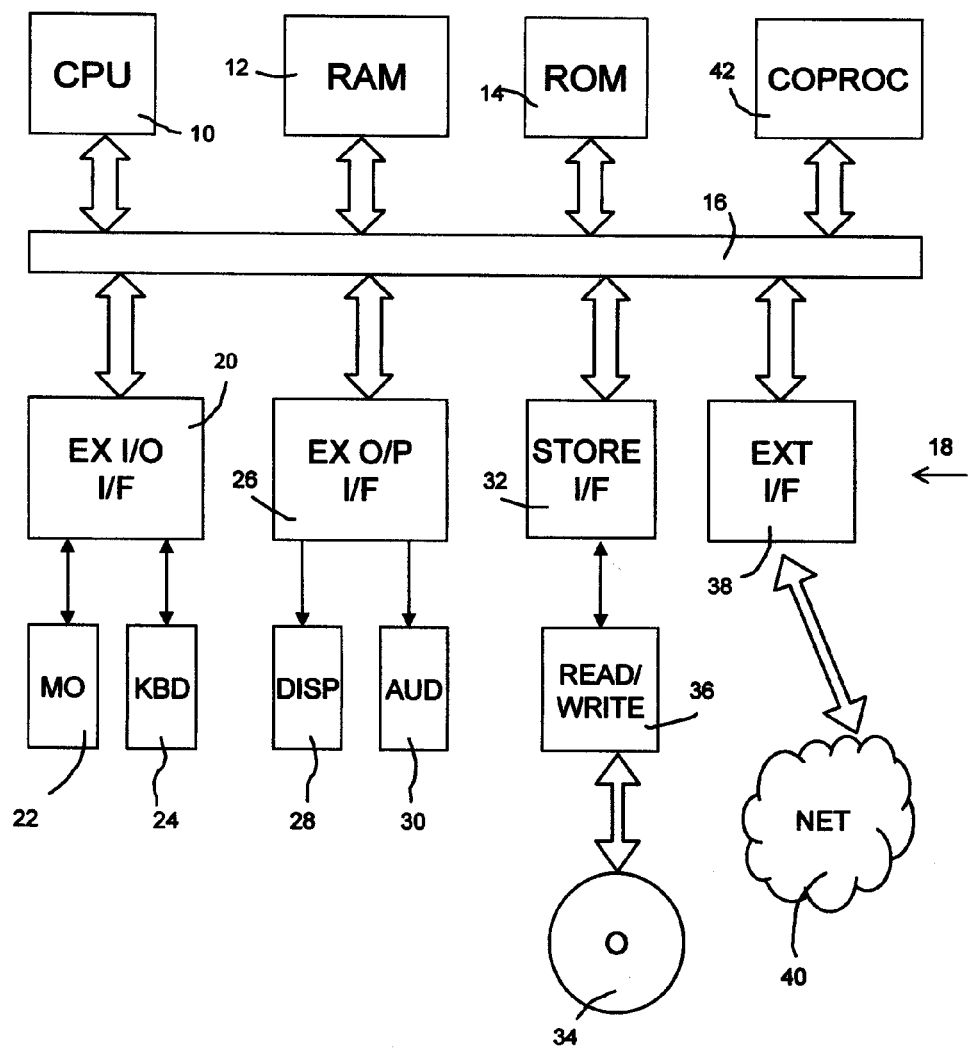
FIG. 2 shows in greater detail components of an apparatus suitable for use in the system of FIG. 1.

FIG. 2 schematically represents the components of a computer system suitable to embody the present invention. A first processor CPU 10 is coupled with random access memory RAM 12 and read only memory ROM 14 by an address and data bus 16. As will be understood, CPU 10 may comprise a cluster of processors (nodes) with individual processes and/or process threads being handled by individual nodes. Also connected to CPU 10 via the address and data bus 16 is at least one further processor 42 (or cluster of nodes), which may be a further CPU sharing tasks with the first CPU 10, or may be a coprocessor device supplementing the function of the CPU 10, handling processes such as floating point arithmetic, graphics processing, signal processing and encryption. Each of these internal hardware devices 10, 12, 14, 42 includes a respective interface (not shown) supporting connection to the bus 16. These interfaces are conventional in form and need not be described in further detail Also connected to the CPU 10 via bus 16 are a number of external hardware device interface stages (generally denoted 18). A first interface stage 20 supports the connection of external input/output devices, such as a mouse 22 and/or keyboard 24 (equivalent to input stage 7 in FIG. 1 through which the user enters indicia and/or start/stop commands). A second interface stage 26 supports the connection of external output devices such as a display screen 28 (and/or audio output device 30, such as headphones or speakers) through which the PAVS 1 may be presented to the user. A third interface stage 32 supports the connection to external data storage devices in the form of computer readable media: such external storage may as shown be provided by a removable optical or magnetic disc 34 (accessed by a suitably configured disc reader 36). Alternatively or additionally the external storage may be in the form of a solid state memory device such as an extension drive or memory stick. The external storage may contain a computer program, containing program software code portions which, when run by the CPU 10 and/or further processor 42, perform the method according to the present invention.

A fourth interface stage 38 supports connection of the system to remote devices or systems via wired or wireless networks 40, for example over a local area network LAN, via the internet, or another cloud computing source. The network 40 will provide the source for the streams S.1-S.5 of FIG. 1, with the CPU 10 and interface 38 providing the monitoring means 3, and the local 12 and offline 32, 34, 36 storage providing the recording stage 2.

Figure 3:
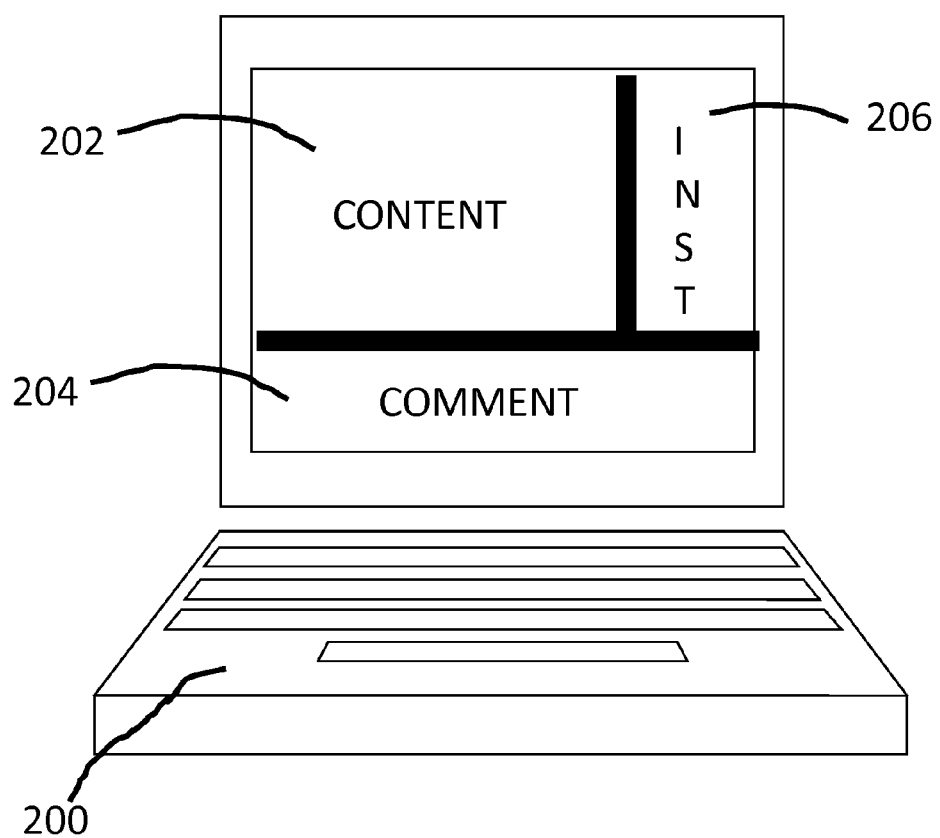
FIG. 3 represents the presentation of a created personalized AV stream on a personal computer.

It will be readily understood that there are many physical forms that the apparatus may take, such as an interlinked combination of a television, DVR (digital video recorder) or PVR (personal video recorder), and personal computer. Another possible arrangement is shown in FIG. 3, in which all of the functional components are provided within a personal computer 200, either coupled to an external AV feed (not shown) or accessing AV content over the internet. Suitably the screen space is divided into separate windows to display the AV content 202, to display the captured comment(s) 204, and to provide an instruction menu space in window 206 (perhaps including clickable buttons for the start/stop capture options described above, a field for entry of specific indicia, means for inputting default selections such as the duration of capture, and so forth). As will be described below, the window 206 may provide a menu list of comment streams associated with a particular AV stream, such that a user can make a selection of the sources of comments to be included in the PAVS.

Figure 4:
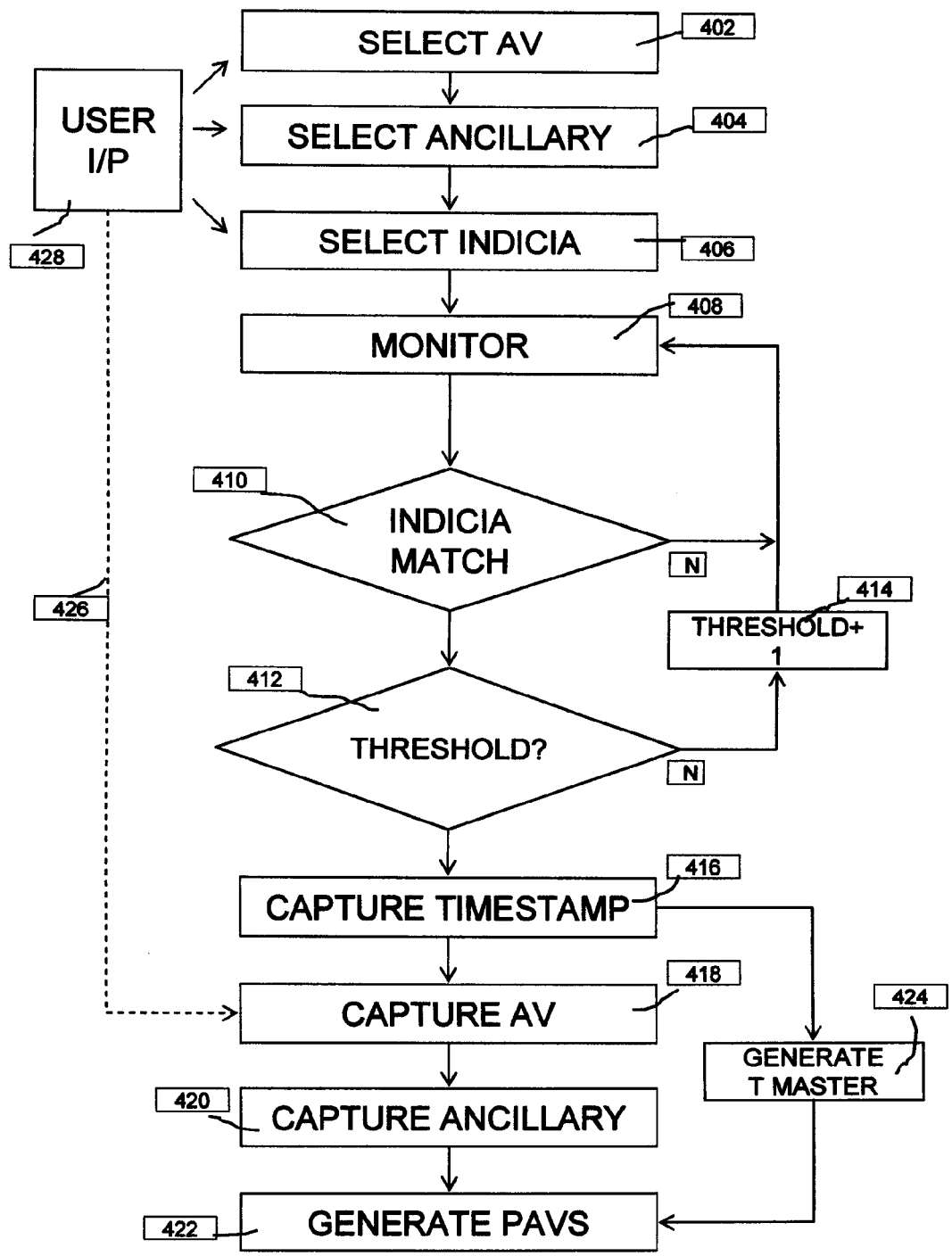
FIG. 4 is a flow chart showing steps in a method for creation of a personalized AV stream embodying aspects of the present invention.

The basic steps of a method embodying various aspects of the invention will now be described with reference to the flow chart of FIG. 4. The process starts at step 402 with the selection of a first stream of AV data by reference to predetermined user preferences. This may comprise an analysis of a users past viewing history to identify a suitable AV stream of potential interest to a user, or it may be as simple as a user directly inputting 428 a selection (e.g. choosing a television program).

The next step 404 is selecting one or more further data streams (ancillary sources) having a predetermined relation to the first stream, for example social media feeds directly associated with the selected AV stream. As before, this selection made be made by reference to user input 428, perhaps to select the feeds to be monitored and optionally, if there are likely to be an excessive number of posted comments, to limit the captured comments.

The issue of scalability arises when, for example, there are a large number of people in a users "friends" stream all commenting on the program. The number of comments on an event may exceed the ability of the embedding system to display them in the space and time appropriate. One preferred solution to this is to use existing algorithms (such as those used by a Facebook friends stream) to prioritize which friends a user wishes to hear from. For example, selection criteria may include how often a user interacts with them, or by whether their comments are part of a conversation or standalone.

At step 406, the indicia determining capture are specified, again potentially as a result of direct user input 428. As outlined above, these indicia may comprise specific keywords or groups of keywords in one of the comment streams or a subtitle stream accompanying the AV stream, or may comprise sudden changes of volume in the audio component of the AV stream. Where a speech-to-text utility is incorporated, then spoken keywords in the audio component of the AV stream may also be used as indicia. Additionally, a second indicia or group of indicia may be specified that trigger exclusion from the PAVS, thereby allowing a user to refine the selection further.

At step 408 the process of monitoring the selected stream or streams commences, with step 410 (looping back to 408 in the case of a negative result) determining when a predetermined indicia is matched. As an optional step 412, the number of matches is compared to a pre-stored threshold level: if the threshold has not been reached, the number of detected instances of the indicia is incremented by 1 at step 414 and the monitoring continues from step 408.

In the absence of a threshold check, or if the threshold has been reached, the process moves to step 416 at which a timestamp for the match is captured (e.g. from timeline S.2), following which a portion of the AV stream is captured at step 418. As indicated by dashed line 426, the capture may be by reference to user input 428, whether in terms of a specified duration of AV stream to capture or, effectively bypassing the monitoring process, through the user input of a direct "capture" command.

At step 420, data from the ancillary (comment) streams is captured and stored with the AV data. Through the timestamp captured at 416, input on comment streams may be tied to an AV stream event, even if the comment is posted at a later time so that, although the monitoring stage may stop synchronizing with the recorder for AV content at the end of a broadcast, it may continue search on social media for a pre-defined length of time.

At step 422, the personalized AV stream is created, bringing together in sequence each captured AV segment with the comments associated with that segment. In order to facilitate the sequencing and playback, a master timeline is suitably generated (step 424) by reference to the captured timestamps from the selected stream S.2, thereby enabling a user to subsequently switch on the PVR (or other form of apparatus used for the recording) and watch the highlights or the entire video stream with tagged comments appended to the appropriate points of the AV stream.

As identified above, a particular feature is to identify a reference stream which provides the source of the timestamps and which defines the times at which events have occurred. This reference stream could be one of the following:

a) The public timeline. Here the system uses a comment stream (for example containing friends' updates) to retrieve the content which is embedded. It also monitors a public timeline for comments which are related, by hashtag or by content, to those of friends. The generally large number of people in the sample will give a smooth distribution with a peak at the moment when most people were commenting on the event. This suitably defines the timestamp that the comments embedded from friends are keyed from.

b) A master comment stream. Some programs have an associated Twitter account that tweets along with the program, or a live commentary in the case of any live events. The timing defined by this stream could be used as the reference.

c) An already embedded subtitles track. Most programs on broadcast television, even those which are live, contain an embedded subtitles track. The text in this track can be compared to the content of the comments on the social media stream to judge the point at which an event occurred. (for example "GOAL!", "You're fired!").

Figure 5:
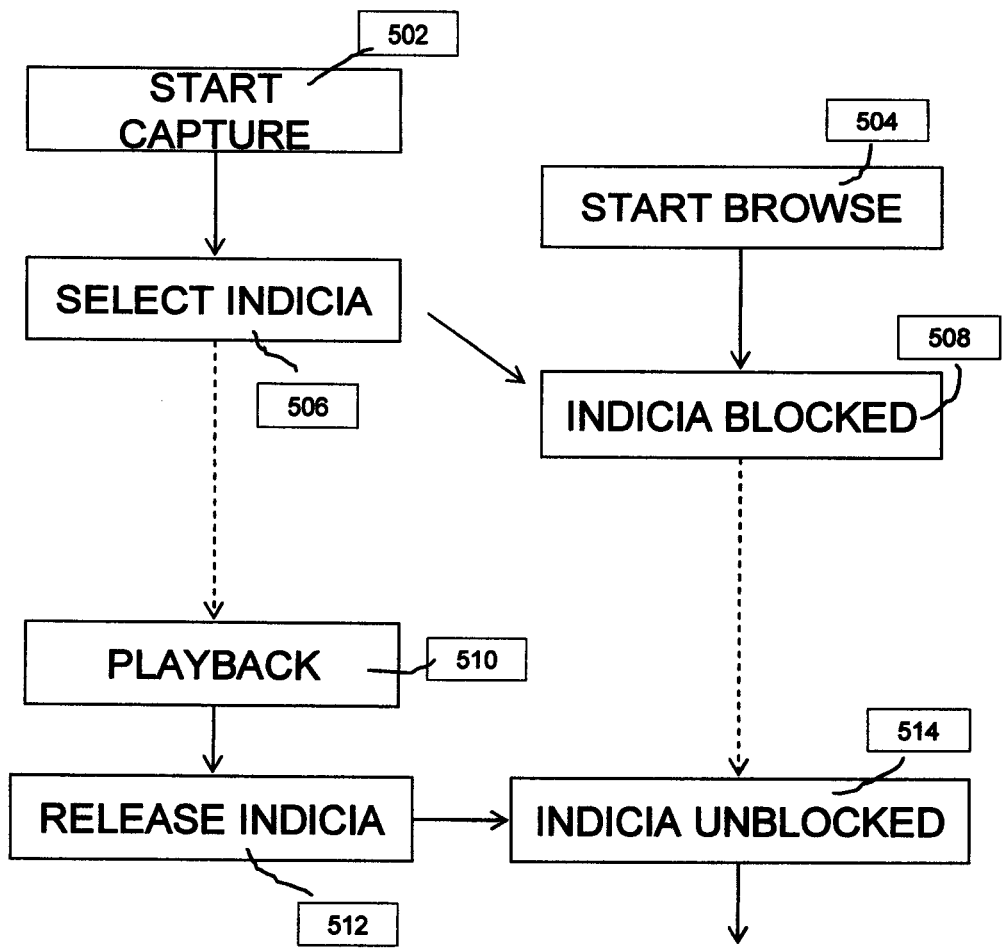
FIG. 5 schematically represents an additional feature linking a system such as that of FIG. 1 to a general purpose browser.

As illustrated in FIG. 5, the aspects of the foregoing embodiments relating to the selection of appropriate comments for later embedding in an item of replayed media, also allow the extraction or filtering of comments from a social media feed to happen. As represented at 502 a user may initiate the content plus comment capture process but then desire to continue browsing the social media (at 504) whilst the recording is ongoing. Those indicia selected for capture of ancillary data at 506 in the recording process may also be ported to the user's general browser at 508 to block user access to comments matching those indicia. This will allow a user to continue to browse their social feeds with the removal of comments that could act as spoilers for the recorded media, by using the same mechanism as described previously. The block may be directly cancelled by a user or it may be linked to the recording system such that only when playback has occurred at 510 does the system issue a release command at 512 which unblocks the general browser at 514.

As comment threads stemming from the original event continue they are likely to diverge from the original subject matter. The content of the comments can be compared with the content of the master stream. Through this comparison it can be judged whether the comment in the thread is relevant to the initial event, irrelevant, or relevant to a new event. Based on this comparison one of the following actions could be performed on the comments:

a) The comments can be embedded at the time they occur relative to the comment that started the thread.

b) The comments can be not embedded.

c) The comments can be embedded at the time related to the new event, and be considered to begin a new thread.

In terms of deciding at what point the embedding process occurs, three possible options are:

a) The embedding happens as the program is being recorded. Because of the time it takes people to react to an event and process their thoughts into what they want to enter as a comment, this embedding would not happen immediately, but would more likely be on a 5 minute delay. For example, if a goal is scored in a football match the viewer would possibly first celebrate with the people in the room, have a drink, and then watch the replay before making a comment on social media. The advantage of this method is that the person who wishes to watch the program with the embedded comment stream could watch it on a short time lag while the program is still on.

b) The embedding happens after the program has finished, possibly at the point the user requests playback. After the program is over the social media stream and the reference stream are compared and the comments are embedded to create the master timeline and the PAVS as at step 422 in FIG. 4. The advantage of this is that there may be a lot of post-program analysis and discussion. This discussion can also be included in the embedded comments, taking place over the credits or after the program has finished.

c) Both, the embedding happens as the program goes along, but is further refined by comments that occur after the program is finished. This provides a recorded program with embedded comments which can be watched on a small lag from the live event, but if the person recording the program chooses to watch the recording much later then the PVR can continue to monitor the social media stream and additional comments from the social media stream can be added in at the appropriate point—including comments from other viewers who may have time-shifted the program.

In accordance with a first aspect of the present invention there is provided a method for creating a personalized audio and/or video (AV) stream for a user, comprising:

selecting a first stream of AV data by reference to predetermined user preferences;

selecting one or more further data streams having a predetermined relation to the first stream;

identifying and capturing portions of the first stream by reference to identifying predetermined indicia in said first stream or one of said one or more further data streams, including capturing one or more time stamps from the first or further stream; and generating a personalized AV stream comprising a captured portion of the first stream and data selected by reference to said predetermined indicia from at least one of said one or more further data streams, said selection being based on the or each captured time stamp. By reference to the captured time stamp, the data from the ancillary data streams can be linked to the captured AV content such that, for example, later posted comments on a social media feed can be matched up with the AV content that lead to their creation.

Suitably, the method includes defining a master timeline by reference to a time signal containing a sequence of timestamps in the first stream or a selected one of the one or more further data streams. As will be described in further detail by reference to potential embodiments of the invention, the source of the master timeline may comprise a public timeline, a master component stream, or a subtitle track accompanying the AV stream.

The timestamp at which a predetermined indicia is matched may be used to determine the extent of the portion of the first stream that is captured. For example, a digital recording device may be continuously capturing the AV content, and the captured portion added to the personalized AV stream may comprise a certain number of minutes before and/or after the time stamp.

The user may be enabled to specify an extent for the period of capture for at least one of the first stream and/or all or each of the other data streams, and user-operable means may be provided to indicate the start and/or end of a portion of the first stream to be captured. In this way, a user may construct their own highlights package from an AV stream, with the captured supporting data (comments for example) just relating to those highlights identified by the user.

Playback suitably comprises presenting the personalized AV stream to a user via an audio and video playback device, including presenting on a part of the screen the data captured from the or each further data stream. The screen layout is an important consideration: the ancillary data should be clearly readable but not intrusive. Past experiments with live comment feeds being pasted on top of AV content have shown this arrangement to be unpopular with users.

Where the first stream includes an audio component, the predetermined indicia may be a predetermined audio pattern in the first stream, for example individual keywords or a sudden increase in volume (perhaps indicative of a goal being scored). If the first (AV) stream is a video data stream including an associated subtitle data stream, the master timeline may be defined by timestamps in the subtitle date stream.

Furthermore, particular text streams within the subtitle data stream (such as particular keywords or phrases) may provide the predetermined indicia.

In embodiments where the triggering for identification and capture is based on the ancillary data (rather than the AV stream), the predetermined indicia may be a predetermined keyword or combination of keywords in the one or more further data streams. As an example, if a contributor on a social media stream were to enter the phrase "CATCH THIS", the previous few minutes of AV would be captured and linked to the contributor comment for inclusion in the personalized stream.

In order to avoid so-called "spoilers", the method may further comprise the identification of a second predetermined indicia or group of indicia, whereby the identification of such causes exclusion from the personalized AV stream. For example, where the personalized stream comprises the highlights of a sporting event, any detection of a phrase such as "the final score" may trigger exclusion to avoid the user being inadvertently notified of the outcome before it is reached in the AV stream. As will be described below with reference to an embodiment of the invention, use of indicia to block comments may be applied to a user's general browser so that he/she may continue to browse social media streams whilst the recording and capture is ongoing whilst reducing the risk of spoilers associated with the recorded content.

In the case of particularly popular items of AV content, the volume of ancillary data may become excessive. To address this, the user may suitably be provided with means to restrict the volume of captured data. This may comprise enabling user selection of the one or more further data streams from a list of available data streams (such as to choose only the comment streams of interest), or a set of pre-stored user preferences may be used to select one or more of the one or more further data streams for contribution to the personalized AV stream, for example only accepting comments from a "friends" list, perhaps triggered by the exceeding of a predetermined threshold on the volume of ancillary data to be accepted and added to the personalized AV stream.

The present invention further provides an apparatus operable to create a personalized audio and/or video (AV) stream for a user, comprising:

a data recorder connectable to, and operable to record data from, a first stream of AV data and one or more further data streams having a predetermined relation to the first stream;

monitoring means coupled with the data recorder and configured to identify predetermined indicia in said first stream or one of said one or more further data streams and, in response thereto, cause the data recorder to capture a portion of the first stream, including capturing one or more time stamps from the first or further stream;

wherein the data recorder is further operable to generate and play back a personalized AV stream comprising a captured portion of the first stream and data selected by reference to said predetermined indicia from at least one of said one or more further data streams, said selection being based on the or each captured time stamp. The data recorder may be further operable to create and store a master timeline by reference to a time signal containing a sequence of timestamps in said first stream or a selected one of said one or more further data streams.

Note that in one or more embodiments, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described above, the technical scope of the invention is not limited to the scope of the above-described embodiments. It should be apparent to those skilled in the art that various changes or improvements can be made to the embodiments. It is apparent from the description of the appended claims that implementations including such changes or improvements are encompassed in the technical scope of the invention.

The invention claimed is:

1. A method for creating a personalized audio and/or video (AV) stream for a user, the method comprising:
   selecting, by one or more processors, a first stream of AV data by reference to predetermined user preferences;

selecting, by one or more processors, one or more further data streams having a predetermined relation to the first stream;
identifying, by one or more processors, a predetermined indicia from the one or more further data streams;
in response to identifying the predetermined indicia from the one or more further data streams, capturing, by a data recorder, a portion of the first stream by reference to identifying predetermined indicia in a group of streams consisting of said first stream and said one or more further data streams, wherein said capturing further comprises capturing one or more time stamps from the group of streams;
generating, by one or more processors, a personalized AV stream comprising the captured portion of the first stream and data selected by reference to said predetermined indicia from at least one of said one or more further data streams, said data selected being based on each captured time stamp, and wherein the one or more further data streams are postings from a social network by social network friends of the user;
buffering, by one or more processors, a predefined amount of content from the first stream of AV data;
detecting, by one or more processors, a predetermined term from the postings from the social network;
in response to detecting the predetermined term from the postings from the social network, capturing and storing, on a storage device, the predefined amount of content from the first stream of AV data for incorporation into the personalized AV stream;
detecting, by one or more processors, that postings from all members of the social network related to an event depicted on the first stream AV data exceed a predetermined frequency; and
in response to detecting that the postings from all members of the social network related to the event depicted on the first stream of AV data exceed the predetermined frequency, retrieving, by one or more processors, social network comments from predefined social network friends of the user for use as the data selected for inclusion in the personalized AV stream.

2. The method as claimed in claim 1, further comprising:
defining, by one or more processors, a master timeline by reference to a time signal containing a sequence of timestamps in said group of streams.

3. The method as claimed in claim 2, wherein the first stream is a video data stream including a subtitle data stream, and wherein the master timeline is defined by the subtitle data stream, and wherein text streams within the subtitle data stream provide the predetermined indicia.

4. The method as claimed in claim 1, wherein a user is enabled to specify an extent for a period of capture for at least one of the first stream and the other data streams.

5. The method as claimed in claim 1, further comprising:
presenting, by one or more processors, the personalized AV stream to a user via an audio and video playback device that comprises a display screen, including presenting on a part of the display screen data captured from a group of streams.

6. The method as claimed in claim 1, wherein the first stream includes an audio component, and said predetermined indicia is a predetermined audio pattern in said first stream.

7. The method as claimed in claim 1, wherein the predetermined indicia is a predetermined keyword or combination of keywords in said one or more further data streams.

8. The method as claimed in claim 1, further comprising:
identifying, by one or more processors, a second predetermined indicia in the group of streams; and
excluding, by one or more processors, said one or more further data streams from the personalized AV stream in response to identifying the second predetermined indicia.

9. The method as claimed in claim 1, further comprising:
providing, by one or more processors, user-operable means to indicate a start and end of a portion of the first stream to be captured.

10. The method as claimed in claim 1, further comprising:
enabling, by one or more processors, user selection of said one or more further data streams from a list of available data streams.

11. The method as claimed in claim 1, wherein a set of pre-stored user preferences are used to select one or more of said one or more further data streams for contribution to said personalized AV stream.

12. The method as claimed in claim 1, wherein a set of pre-stored user preferences are used to select one or more of said one or more further data streams for contribution to said personalized AV stream.

13. The method of claim 1, further comprising:
identifying, by one or more processors, postings on the social network from friends of the user who have had more than a predetermined quantity of social network interactions with the user during a predefined period of time; and
limiting, by one or more processors, the data selected for incorporation into the personalized AV stream to the postings on the social network from the friends of the user who have had more than the predetermined quantity of social network interactions with the user during the predefined period of time.

14. The method of claim 1, wherein the first stream of AV data is a television broadcast, and wherein said one or more further data streams are social media streams carrying comments related to the television broadcast.

15. A computer program product for creating a personalized audio and/or video (AV) stream for a user, the computer program product comprising a computer readable storage medium having program code embodied therewith, the program code readable and executable by a processor to perform a method comprising:
selecting a first stream of AV data by reference to predetermined user preferences;
selecting one or more further data streams having a predetermined relation to the first stream;
identifying a predetermined indicia from said one or more further data streams;
in response to identifying the predetermined indicia from the one or more further data streams, capturing, by a data recorder, a portion of the first stream by reference to identifying predetermined indicia in a group of streams consisting of said first stream and said one or more further data streams, wherein said capturing further comprises capturing one or more time stamps from the group of streams;
generating a personalized AV stream comprising the captured portion of the first stream and data selected by reference to said predetermined indicia from at least one of said one or more further data streams, said data selected being based on each captured timestamp, and wherein the one or more further data streams are postings from a social network by social network friends of the user;

buffering a predefined amount of content from the first stream of AV data;

detecting a predetermined term from the postings from the social network;

in response to detecting the predetermined term from the postings from the social network, capturing and storing, on a storage device, the predefined amount of content from the first stream of AV data for incorporation into the personalized AV stream;

identifying postings on the social network from friends of the user who have had more than a predetermined quantity of social network interactions with the user during a predefined period of time; and limiting the data selected for incorporation into the personalized AV stream to the postings on the social network from the friends of the user who have had more than the predetermined quantity of social network interactions with the user during the predefined period of time.

16. The computer program product of claim 15, wherein the first stream is a video data stream including a subtitle data stream, and wherein the master timeline is defined by the subtitle data stream, and wherein text streams within the subtitle data stream provide the predetermined indicia.

17. The computer program product of claim 15, wherein the method further comprises:

identifying a second predetermined indicia in the group of streams; and excluding said one or more further data streams from the personalized AV stream in response to identifying the second predetermined indicia.

18. A computer system comprising:

a processor, a computer readable memory, and a non-transitory computer readable storage medium;

first program instructions to select a first stream of AV data by reference to predetermined user preferences;

second program instructions to select one or more further data streams having a predetermined relation to the first stream;

third program instructions to identify a predetermined indicia from said one or more further data streams;

fourth program instructions to, in response to identifying the predetermined indicia from the one or more further data streams, capture, via a data recorder, a portion of the first stream by reference to identifying predetermined indicia in a group of streams consisting of said first stream and said one or more further data streams, wherein said capture further comprises a capture of one or more time stamps from the group of streams;

fifth program instructions to generate a personalized AV stream comprising the captured portion of the first stream and data selected by reference to said predetermined indicia from at least one of said one or more further data streams, said data selected being based on each captured timestamp, and wherein the one or more further data streams are postings from a social network by social network friends of the user;

sixth program instructions to buffer a predefined amount of content from the first stream of AV data;

seventh program instructions to detect a predetermined term from the postings from the social network;

eighth program instructions to, in response to detecting the predetermined term from the postings from the social network, capture and store, on a storage device, the predefined amount of content from the first stream of AV data for incorporation into the personalized AV stream;

ninth program instructions to identify postings on the social network from friends of the user who have had more than a predetermined quantity of social network interactions with the user during a predefined period of time; and tenth program instructions to limit the data selected for incorporation into the personalized AV stream to the postings on the social network from the friends of the user who have had more than the predetermined quantity of social network interactions with the user during the predefined period of time; and wherein the first, second, third, fourth, fifth, sixth, seventh, eighth, ninth, and tenth program instructions are stored on the non-transitory computer readable storage medium for execution by the CPU via the computer readable memory.

* * * * *